F. W. COLBY.
APPARATUS FOR MANUFACTURING PIPE.
APPLICATION FILED JAN. 19, 1916. RENEWED DEC. 12, 1921.
1,422,834.
Patented July 18, 1922.
3 SHEETS—SHEET 1.
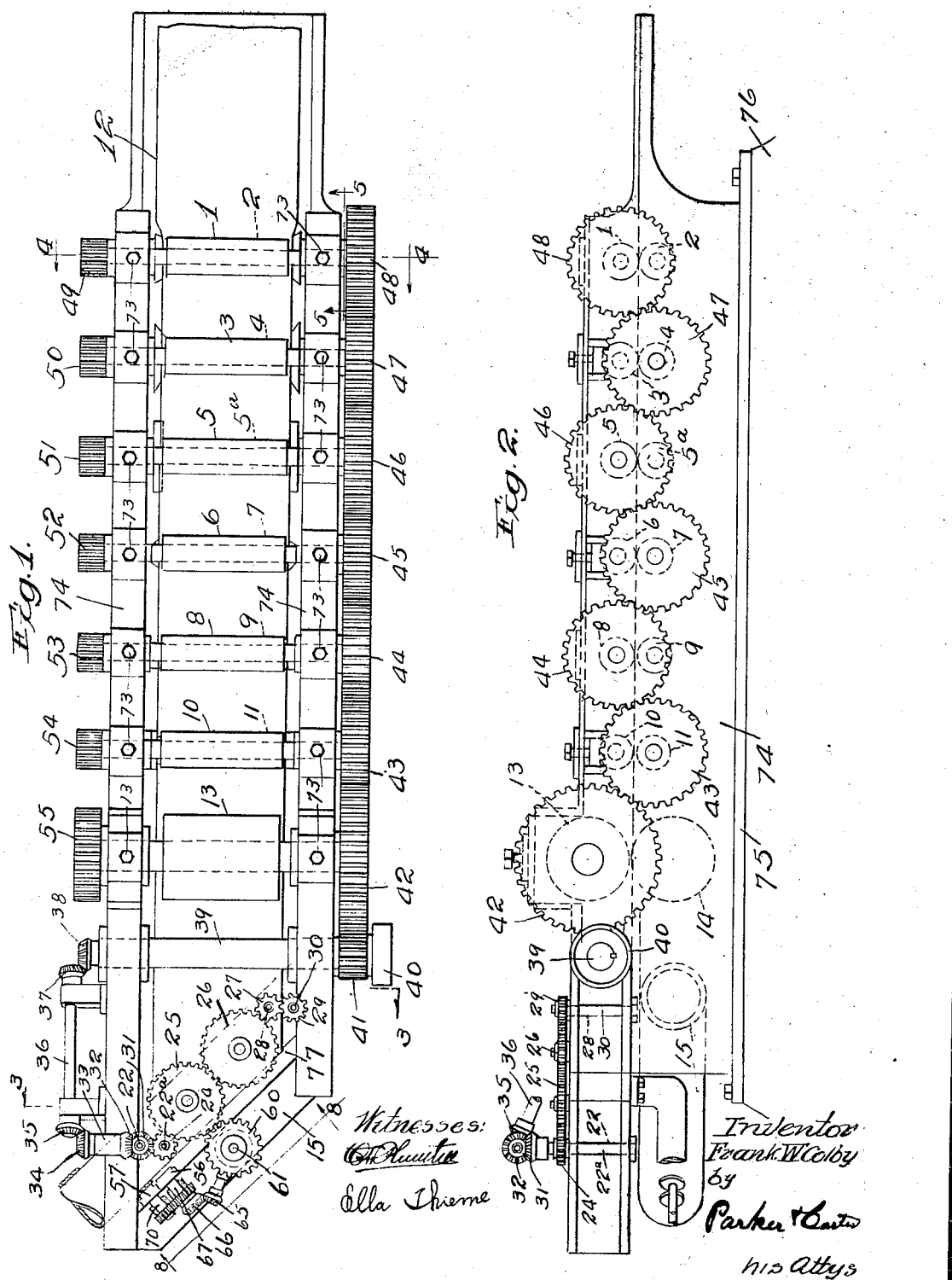

F. W. COLBY.
APPARATUS FOR MANUFACTURING PIPE.
APPLICATION FILED JAN. 19, 1916. RENEWED DEC. 12, 1921.
1,422,834.
Patented July 18, 1922.
3 SHEETS—SHEET 2.
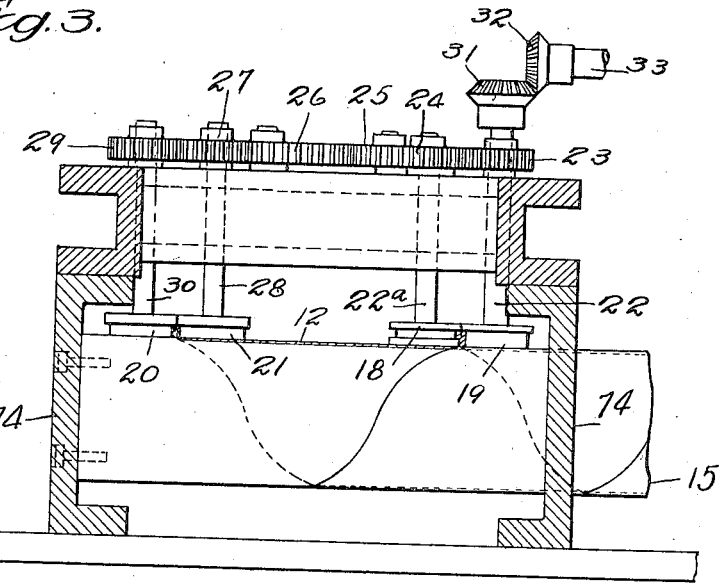
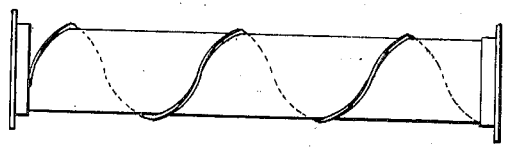
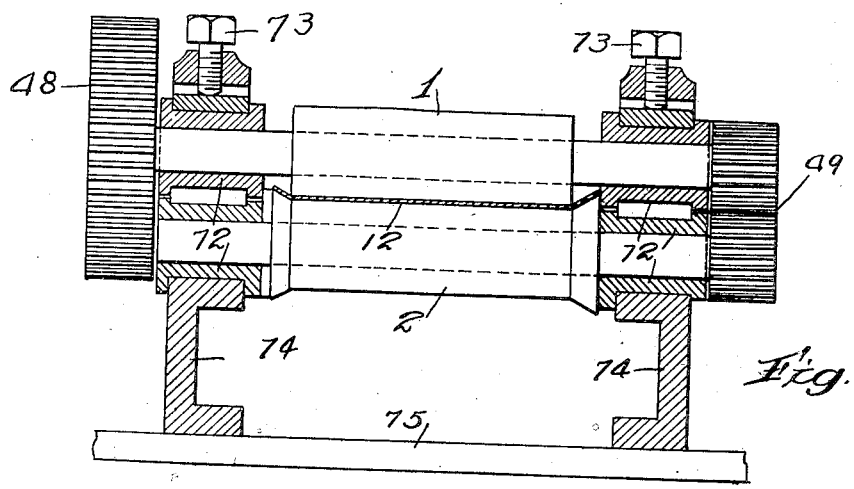

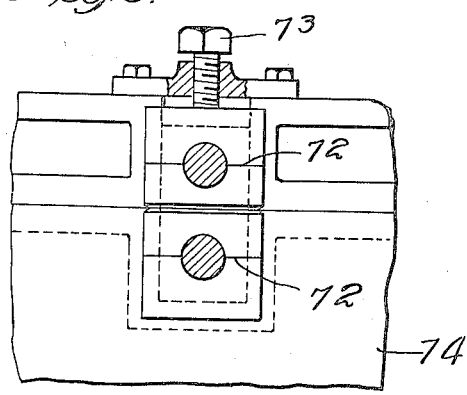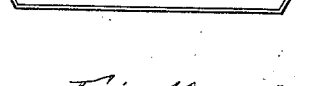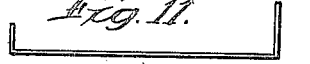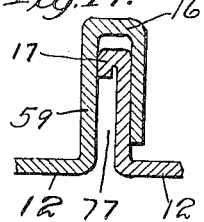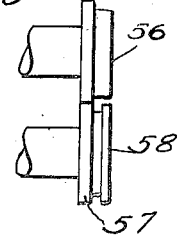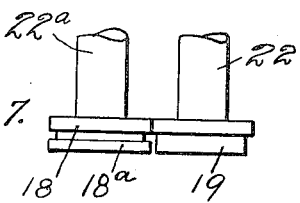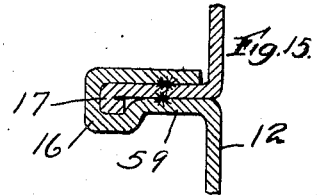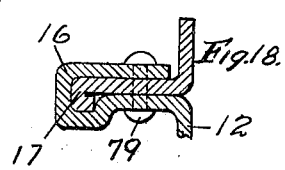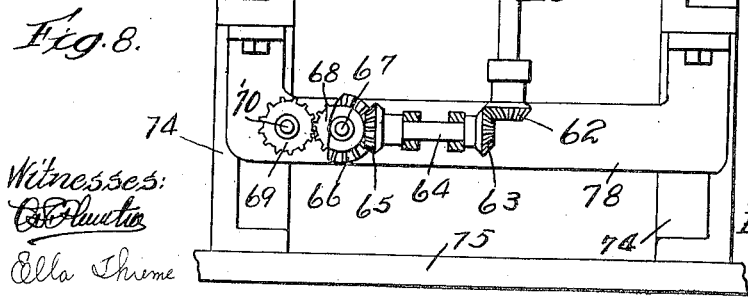

UNITED STATES PATENT OFFICE.

FRANK W. COLBY, OF CHICAGO, ILLINOIS, ASSIGNOR TO THE KANSAS CITY SPIRAL PIPE COMPANY, A CORPORATION.

APPARATUS FOR MANUFACTURING PIPE.

1,422,834.                Specification of Letters Patent.    Patented July 18, 1922.

Application filed January 19, 1916, Serial No. 72,949. Renewed December 12, 1921. Serial No. 521,921.

*To all whom it may concern:*

Be it known that I, FRANK W. COLBY, a citizen of the United States, residing at Chicago, in the county of Cook and State of Illinois, have invented a certain new and useful Improvement in Apparatus for Manufacturing Pipe, of which the following is a specification.

This invention relates to apparatus for making pipe, and has for its object to provide a new and improved apparatus of this description, by means of which a spiral reinforced pipe may be made from a single strip of material.

The invention is illustrated in the accompanying drawings, wherein—

Figure 1 is a plan view of one form of apparatus embodying the invention;

Figure 2 is a side elevation of the apparatus illustrated in Fig. 1;

Figure 3 is a sectional view taken on line 3—3 of Fig. 1;

Figure 4 is a sectional view taken on line 4—4 of Fig. 1;

Figure 5 is a sectional view taken on line 5—5 of Fig. 1;

Figure 6 is a view showing the compressing rollers;

Figure 7 is a view showing the two combined stretching and compressing rollers, which act upon the two bent edges of the strip when they are together;

Figure 8 is a view taken on line 8—8 of Fig. 1;

Figures 9, 10, 11, 12, 13 and 14 are views of the strip of material as the edges thereof are successively bent into different shapes as the strip of material passes through the apparatus;

Figure 15 is an enlarged view showing the joint between the adjacent edges of the strip of material after being formed into the pipe;

Figure 16 is a view showing a piece of the pipe.

Figure 17 is a view showing the adjacent bent edges of the strip as they come together and before they are compressed;

Figure 18 is a view similar to Fig. 15, showing the use of rivets for riveting the parallel overlapping parts of the bent portions together.

Like numerals refer to like parts throughout the several figures.

In forming the pipe, a single strip of material 12 is used. This strip is of metal and the width and thickness of the strip depends upon the size of pipe it is desired to form. This strip of material passes between a series of rollers which bend both of its edges. In the construction shown these rollers are arranged in pairs, one above the other, and they are all preferably driven by some suitable driving device, the strip of material passing between the rollers of the various sets. The first set of rollers 1 and 2 bend both edges of the strip of material slightly, as shown in Fig. 9. The second set of rollers 3 and 4 bend the edges farther, as shown in Fig. 10. The next set of rollers 5 and 5ª bend the edges as shown in Fig. 11. The next set of rollers 6 and 7 bend the edges as shown in Fig. 12. The next set of rollers 8 and 9 bend the edges as shown in Fig. 13, and the next set of rollers 10 and 11 bend the edges of the strip of material as shown in Fig. 14. It is of course evident that this particular bending might be secured with a different number of rollers differently shaped, but I have shown a simple construction for this purpose, for gradually bringing the edges of the strip of material to the proper shape. I prefer to provide some means for causing the strip of material to pass between the shaping rollers other than the shaping rollers themselves, such for example, as the rollers 13 and 14, the strip of material passing between these rollers and being fed thereby. After the edges of the strip of material are shaped by the shaping rollers to the shape shown in Fig. 14, the strip of material is then passed around the mandrel 15, which forms it into a spiral form. In view of the fact that the outer portions 16 and 17 of the strip of material are farther from the center of the mandrel than the main body thereof, it will be seen that the diameters of the circles such outer portions form when passed around the mandrel, are greater than the diameter of the circle formed by any other portion of the main body of the strip, and hence the circumference of the circles formed by the portions 16 and 17 will be greater than the circumference of the circle formed by any other part of the strip. Some means must, therefore, be provided for compensating for this fact, and for preventing the parts 16 and 17 from being injured or the material torn, because these parts are in fact no longer than the main portion of the strip. I have compensated for this condition by providing means for stretching the metal at the points 16 and 17, so as to secure the longer circumference, thereby preventing injury to the metal. This stretching may be done in any desired manner. As herein shown, it is accomplished by means of stretching rollers. The upturned portion 16 is stretched by the stretching rollers 20 and 21, between which it passes, the rollers being driven from some suitable sources of power and being arranged to give the desired stretch to the metal. These rollers are preferably arranged so that they stretch the metal more near the outer part of the portion 16, the variation in the stretch of the metal depending upon its distance from the center of the circle about which it is formed into the spiral shape. This variation in the stretching may be secured by inclining the faces of the stretching rollers. The bent edge 17, while the pipe is being formed, does not pass around the mandrel until after the bent edge 16 has entered between the parallel portions thereof, as shown in Fig. 17. The stretching rollers 18 and 19, therefore, only act upon it after the parts have taken this position. The roller 18 has a projection 18$^a$, which engages a portion 59 of the metal so as to force it inwardly beneath the short end of the bent edge 17, that is, to the position illustrated in Fig. 15, the stretching rollers at the same time stretching the part 16 so that it may pass around the mandrel without injury. In moving the part 59 inwardly, it will be seen that it will be necessary to draw down the bent edge 17 and hence the edges are formed so that when they come together, as shown in Fig. 17, there is a sufficient space between their outer ends to permit this. The rollers 18 and 19 are therefore combined stretching and compressing rollers and are driven by the shafts 22 and 22$^a$, which are provided with the pinions 23 and 24 meshing with each other, the pinion 24 meshing with a gear 25, which in turn meshes with a gear 26. This latter gear engages a pinion 27 on the shaft 28 carrying the stretching roller 21. The pinion 27 engages a pinion 29 on the shaft 30 carrying the stretching roller 20. The shaft 22 is driven by means of a bevel gear 31, which engages a bevel gear 32 on a shaft 33, said shaft having a second bevel gear 34, which engages a bevel gear 35 on a shaft 36. The shaft 36 has a bevel gear 37 engaging a bevel gear 38 on a driving shaft 39, said driving shaft being driven from any suitable source of supply, as by means of the pulley 40. The shaping rollers and the feeding rollers are driven from the driving shaft 39 by suitable gearing. As herein shown, the shaft 39 is provided with a pinion 41, which engages a gear 42 connected with one of the feeding rollers. The shaping rollers are driven by a series of gears 43, 44, 45, 46, 47 and 48 (see Figs. 1 and 2), each connected to one of the rollers. The two associated feeding rollers are connected together on the other side of the rollers by pinions 49, 50, 51, 52, 53 and 54, while the feed rolls are connected together by the pinions 55. After the joint between the edges of the pipe has passed between the combined stretching and compressing rollers 18 and 19, it then passes between the compressing rollers 56 and 57, shown in Fig. 7. The roller 57 is provided with the inwardly projecting portion 58, which engages the inwardly bent portion 59 of the metal, said rollers insuring the proper compression of the bent edges so as to complete the joint. It is of course evident that these rollers may be omitted if desired, the combined stretching and compressing rollers 18 and 19 being relied upon to secure the desired compression. These rollers 56 and 57 are driven by means of the gear 60, which meshes with the gear 25, and which drives the shaft 61 having at its other end the bevel gear 62, said beveled gear engaging a bevel gear 63 on a shaft 64, said latter shaft having a bevel gear 65 which engages bevel gear 66 on the shaft 67, to which the roller 56 is connected. This shaft 67 has a pinion 68 which meshes with the pinion 69 on the shaft 70, to which the roller 57 is connected. The shafts carrying the different rollers are preferably mounted in movable bearings 72 which are held in place by the screws 73. The apparatus is carried by the two separated frame pieces 74 mounted upon the plate 75 which is supported upon a suitable foundation 76. The mandrel 15 is preferably inclined at such an angle that the bent edge 17 of the pipe as it comes from up under the mandrel will be in position to enter the space 77 between the two parallel overlapping bent portions of the bent edge 16. If the mandrel is not given this proper inclination, it would require some guiding device to cause the parts 17 to enter the space 77, but with the proper inclination, the parts 17 enter this space without any guiding device. The compressing rollers 56 and 57 may be mounted in any desired manner, and as herein shown, they are mounted upon a removable crosspiece 78 connected with the frame pieces 74. When the pipe is formed it takes the shape shown in Fig. 16. The pipe is then in condition to be used under any ordinary conditions. If pipe is to be used where there is great internal pressure, I may fasten the several portions of the bent edges together which form the upstanding flange around the pipe. This fastening may be done in any desired manner, as by spot welding, as illustrated in Fig. 15, or by riveting, as illustrated in Fig. 18, where the rivets 79 pass through the three parallel portions, as shown. It will be seen that the bending inwardly of the portion 59 of the parallel edge produces of itself a lock (see Fig. 15) and this joint is therefore strong enough for any ordinary use without the welding or riveting. When, however, the sections are welded or riveted together, the pipe will stand great internal pressures.

A piece of the pipe when formed, is illustrated in Fig. 16. It will thus be seen that by means of my present invention I am able to make a spiral re-inforced pipe from a single piece of material.

The use and operation of my invention are as follows:

When it is desired to form the pipe, a single strip of material of the desired width and thickness is used and this strip is passed between the shaping rollers 1 to 11 inclusive, which bend the edges of the material into the shape shown in Figs. 9 to 14 inclusive. The material is pulled through the machine by the rollers 13 and 14. After the edges are bent the strip of material passes around the mandrel, but before passing around such mandrel the edge 17 is stretched in any desired manner, as for example, by means of the stretching rollers 20 and 21. The edge 17 is at the left of Fig. 1, as seen from the end of the apparatus into which the strip is fed. The strip is then passed around the mandrel, which is inclined the proper amount to bring the edge 17 as it comes up from under the mandrel, in such a position that it will enter the opening 77 between the substantially parallel portions of the edge 17, taking the position shown in Fig. 17. After the two edges are in this position they pass between the combined stretching and compressing rollers 18 and 19, shown in Figs. 3 and 7. These rollers stretch the bent edge 17 so as to permit it to pass around the mandrel without injuring the material and at the same time the portion 18ª of the roller 18 forces the portion 59 of the metal inwardly as shown in Fig. 15, thereby causing the portion 59 to engage the long portion of the part 17 and to be substantially in the plane of the short portion of the part 17, so as to form a lock to prevent the separation of the parts by pressure in the pipe. The bending in of the part 59 moves the part 16 so that the top thereof engages the top of the part 17, as shown in Fig. 15. These edges then pass between the compressing rollers 56 and 57, which further compresses them. It will thus be seen that the single piece of material is formed into a continuous spiral pipe which has an upstanding, continuous seam or reinforcing part extending spirally therearound, as shown in Fig. 16. It will further be seen that this pipe can be made easily and quickly and cheaply, and that a strong, durable, non-leaking pipe with a smooth interior and capable of standing great internal pressure, is thereby formed. It will further be noted that in forming this pipe, the pressure exerted on the overlapping bent portions to form the tight joint is not pressure perpendicular to the axis of the pipe, but in a plane substantially parallel to the axis of such pipe.

I claim:

1. An apparatus for making spiral pipe from a single strip of material, comprising a series of shaping rollers for bending the edges of the strip of material so that each edge has two parallel overlapping portions at an angle to the main body of the strip, a mandrel at an angle to said strip, about which the strip is wrapped, into spiral form so that the parallel overlapping portions of one edge of the strip fit in between the parallel overlapping portions of the other edge of the strip, and opposed compressing rollers for compressing said parallel portions of the bent edges toward each other to clamp them together.

2. An apparatus for making spiral pipe from a single strip of material, comprising a series of shaping rollers for bending the edges of the strip of material so that each edge has two parallel overlapping portions at an angle to the main body of the strip, one of the parallel portions of one edge being shorter than its associated parallel portion, a mandrel at an angle to said strip, about which the strip is wrapped into spiral form so that the parallel portions at the edge having the short portion fit in between the parallel portions at the other edge of the strip, compressing rollers for pressing the parallel edges toward each other after they are in position, one of said compressing rollers having a projecting part which forces a portion of one of the outer parallel parts of one edge of the pipe in substantial alignment with the short parallel portion of the other edge of the pipe so as to lock the edges together.

3. An apparatus for manufacturing spiral pipe from a single strip of material, comprising means for bending the edges of the strip so that each edge has two overlapping parallel portions substantially at right angles to the main body of the strip, a mandrel at an angle to said strip, about which the strip is wrapped in spiral form, means for stretching the material at the edges of the strip which forms the parallel overlapping sections before it passes about the mandrel so as to increase its length and permit it to pass around the mandrel without injury to the metal, the parallel sections of one edge passing between the parallel sections of the other edge as the strip is wrapped about the mandrel, and a compressing device for forcing the parallel portions of the bent edges toward each other to form a tight joint.

4. An apparatus for manufacturing spiral pipe from a single strip of material, comprising means for bending the edges of the strip at an angle to the main body of the strip, one of said edges bent so as to form two overlapping portions separated by a space, a mandrel inclined with relation to the strip of material and about which it is wrapped in spiral form, the inclination of the mandrel being such that one bent edge passes up in between the overlapping portions of the other bent edge as the strip of material passes around the mandrel, and means comprising opposed devices for exerting lateral pressure simultaneously on opposite sides of said bent edges after they have been brought together so as to decrease the space between the two overlapping portions of the one bent edge and cause them to clamp the other bent edge while remaining in upright position.

5. An apparatus for manufacturing spiral pipe from a single strip of material, comprising means for bending the edges of the strip at an angle to the main body of the strip, one of said edges being bent so as to form two overlapping portions separated by a space, a mandrel inclined with relation to the strip of material and about which it is wrapped in spiral form, the inclination of the mandrel being such that one bent edge passes up in between the overlapping portions of the other bent edge as the strip of material passes around the mandrel, means for stretching said bent edges before they pass around the mandrel, and a compressing device for exerting lateral pressure on said bent edges after they have been brought together so as to decrease the space between the two overlapping portions of the one bent edge and cause them to clamp the other bent edge.

6. An apparatus for making spiral pipe from a single strip of material comprising means for bending the edges of said strip at an angle with the main portion thereof, so that each edge has two overlapping portions, the overlapping portions of one edge separated by a space, one of the overlapping portions of the other edge being shorter than its associated portion, a mandrel at an angle to said strip, about which the strip is wrapped into spiral form so that the edge having the short overlapping portion passes between the overlapping portions of the other edge, and means for simultaneously stretching the overlapping portions of said latter edge and forcing one of said overlapping portions beneath the short overlapping portion of the other edge.

7. An apparatus for manufacturing spiral pipe from a single strip of material, comprising means for bending the edges of the strips at an angle to the main portion thereof, so that said edges have overlapping portions, the overlapping portions of one edge being separated by a space, a mandrel about which said strip is wound in spiral form, said mandrel inclined with relation to the strip so that one bent edge is received between the overlapping portions of the other bent edge, and means comprising opposed devices for exerting lateral pressure on the overlapping portions of said latter bent edge so as to compress the bent edges together in a plane substantially parallel to the axis of said mandrel so as to fasten the edges together.

8. An apparatus for manufacturing spiral pipe from a single strip of material, comprising a series of bending devices for bending the edges of the strip at an angle to the main body thereof, one of said edges being bent so as to form two overlapping portions separated by a space, means for bending said strip of material into spiral form so that the bent edge with the overlapping portions receives the other bent edge between said overlapping portions, and compressing devices comprising opposed devices at the same side of the pipe for applying lateral pressure to the overlapping portions of said bent edge after the two edges have been brought together so as to compress one of said edges between the overlapping portions of the other edge and clamp the edges together.

9. An apparatus for making spiral pipe from a single strip of material comprising a series of shaping rollers for bending the edges of the strip of material so that the edges are substantially at right angles to the main body of the strip, means for forming one of said bent edges into a hook, a mandrel inclined with relation to the edges of said strip about which said strip is wrapped into spiral form so that the substantially parallel portions of the edges of the strip are brought into juxtaposition and the portion at one edge inserted in the hook at the other edge, and opposed compressing rollers for compressing said substantially parallel portions toward each other so that they remain substantially at right angles to the main body of the strip when the pipe is finished.

10. An apparatus for making spiral pipe from a single strip of material comprising shaping rollers for bending one edge of the strip of material at substantially right angles to the body portion of the strip, and for bending the other edge so that it has two overlapping portions substantially at right angles to the main body of the strip and separated by a space, a mandrel at an angle to the edges of said strip about which the strip is wrapped into spiral form so that one bent edge of said strip is received between the over-lapping portions of the other bent edge of said strip, and opposed compressing rollers for compressing between them the over-lapping portions of said latter bent edge towards each other.

11. The process of making spiral pipe from a single strip of material, which consists in bending the edges of the strip of material so that each edge has two parallel overlapping portions at an angle to the main body of the strip, the overlapping portions of one edge being separated by a space, then forming the strip into spiral shape so that one bent edge projects into the space between the substantially parallel portions of the other bent edge, and stretching the substantially parallel portions of one edge before the edges are connected together, and stretching the substantially parallel portion of the other edge after the edges have been brought together.

12. The process of making spiral pipe from a single strip of material, which consists in bending the edges of the strip of material so that each edge has two parallel overlapping portions at an angle to the main body of the strip, the overlapping portions of one edge being separated by a space, then forming the strip into spiral shape so that one bent edge projects into the space between the substantially parallel portions of the other bent edge, and stretching the substantially parallel portions of one edge before the edges are connected together, and stretching the substantially parallel portions of the other edge after the edges have been brought together, and then compressing the substantially parallel, overlapping portions of said bent edges to form a tight joint.

13. The process of making spiral pipe from a single strip of material, which consists in bending the edges of the strip of material so that each edge has two overlapping portions at an angle to the main body of the strip, the overlapping portions of one edge being separated by a space, then forming the strip into spiral shape so that one bent edge projects into the space between the overlapping portions of the other bent edge, and then stretching the overlapping portions of the bent edges by applying pressure to them in a plane substantially parallel with the axis of the spiral into which the pipe is formed.

14. The process of making spiral pipe from a single strip of material, which consists in bending the edges of the strip of material so that each edge has two overlapping portions at an angle to the main body of the strip, the overlapping portions of one edge being separated by a space, then forming the strip into spiral shape so that one bent edge projects into the space between the overlapping portions of the other bent edge, and then applying pressure to the opposite sides of said overlapping portions in a plane substantially parallel to the axis of the spiral so as to tightly clamp the bent edges together.

In testimony whereof, I affix my signature in the presence of two witnesses this 10th day of January, 1916.

FRANK W. COLBY.

Witnesses:
MINNIE M. LINDENAU,
CHRISTINA DEANS.